July 9, 1929. W. C. BRINTON 1,720,204
OBJECT HOLDING RIG FOR TRUCKS
Filed May 16, 1922 6 Sheets-Sheet 2
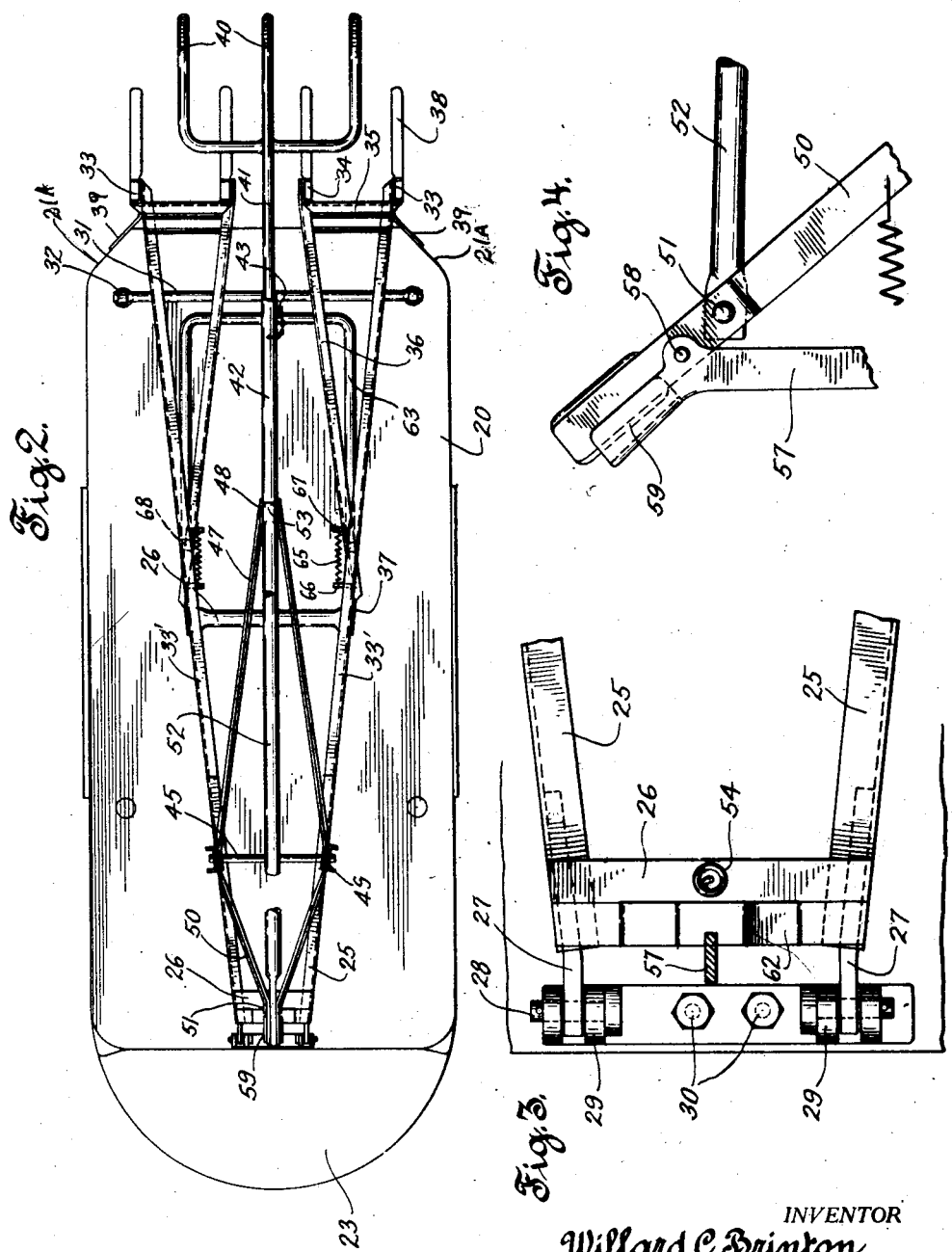
INVENTOR
Willard C. Brinton
BY E. W. Marshall
ATTORNEY July 9, 1929.  W. C. BRINTON  1,720,204
OBJECT HOLDING RIG FOR TRUCKS
Filed May 16, 1922  6 Sheets-Sheet 3

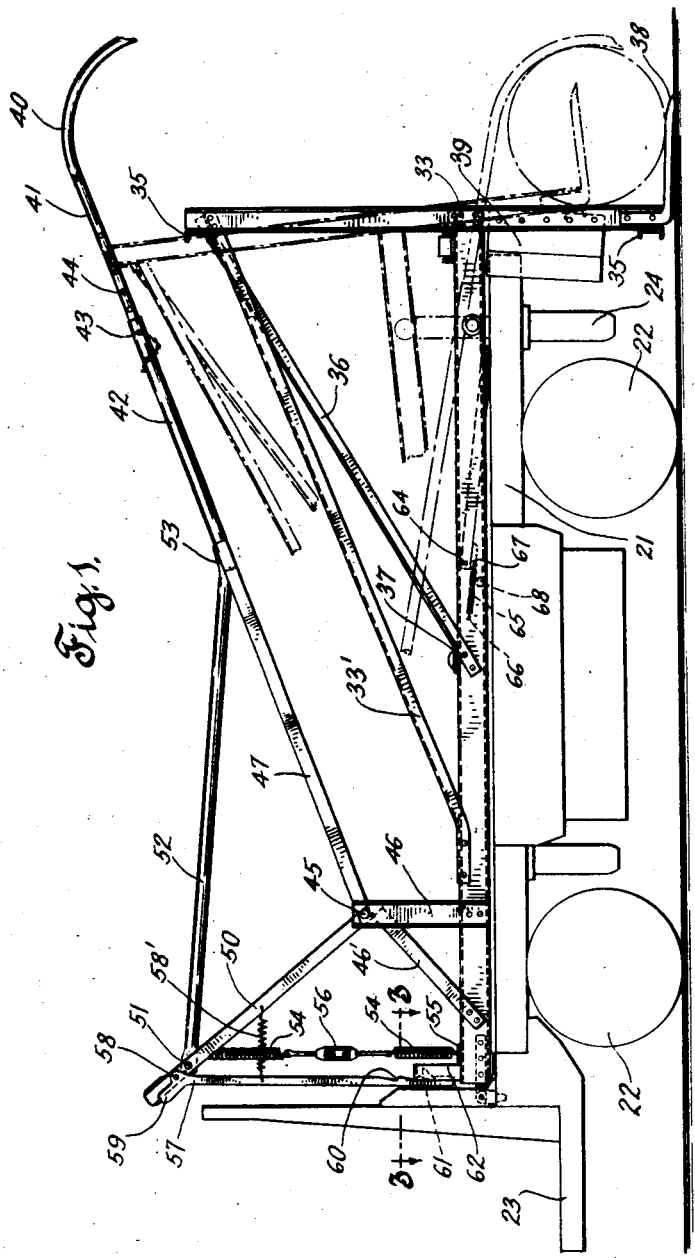

INVENTOR
Willard C. Brinton
BY E. W. Marshall
ATTORNEY

July 9, 1929. W. C. BRINTON 1,720,204
OBJECT HOLDING RIG FOR TRUCKS
Filed May 16, 1922  6 Sheets-Sheet 4
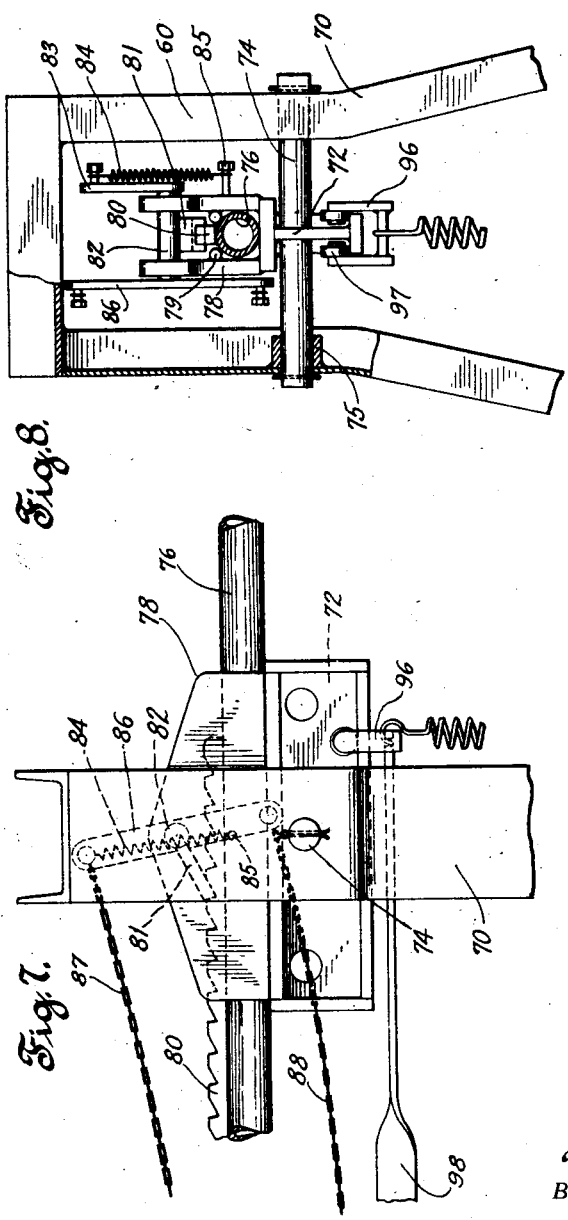
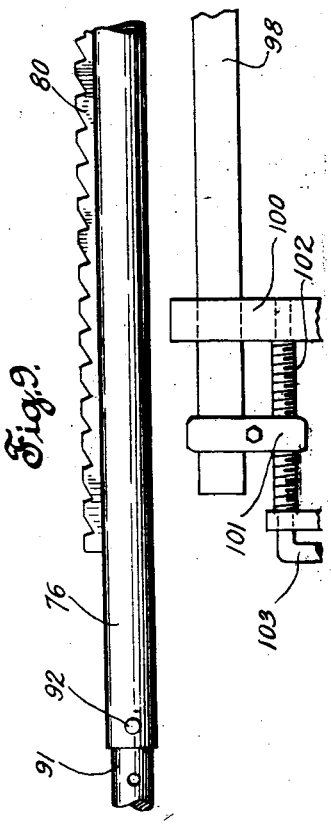
INVENTOR
Willard C. Brinton
BY E. W. Marshall
ATTORNEY

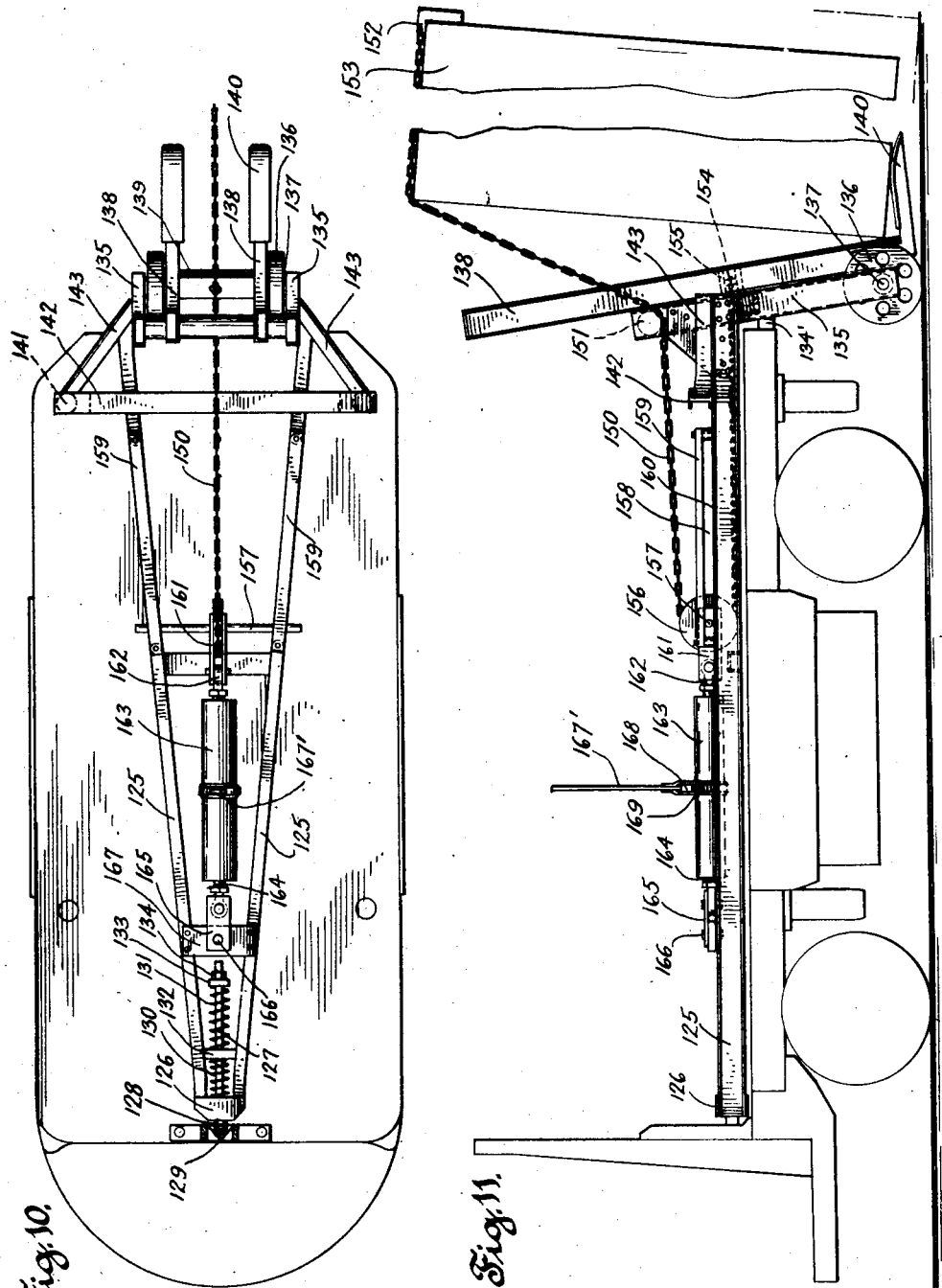

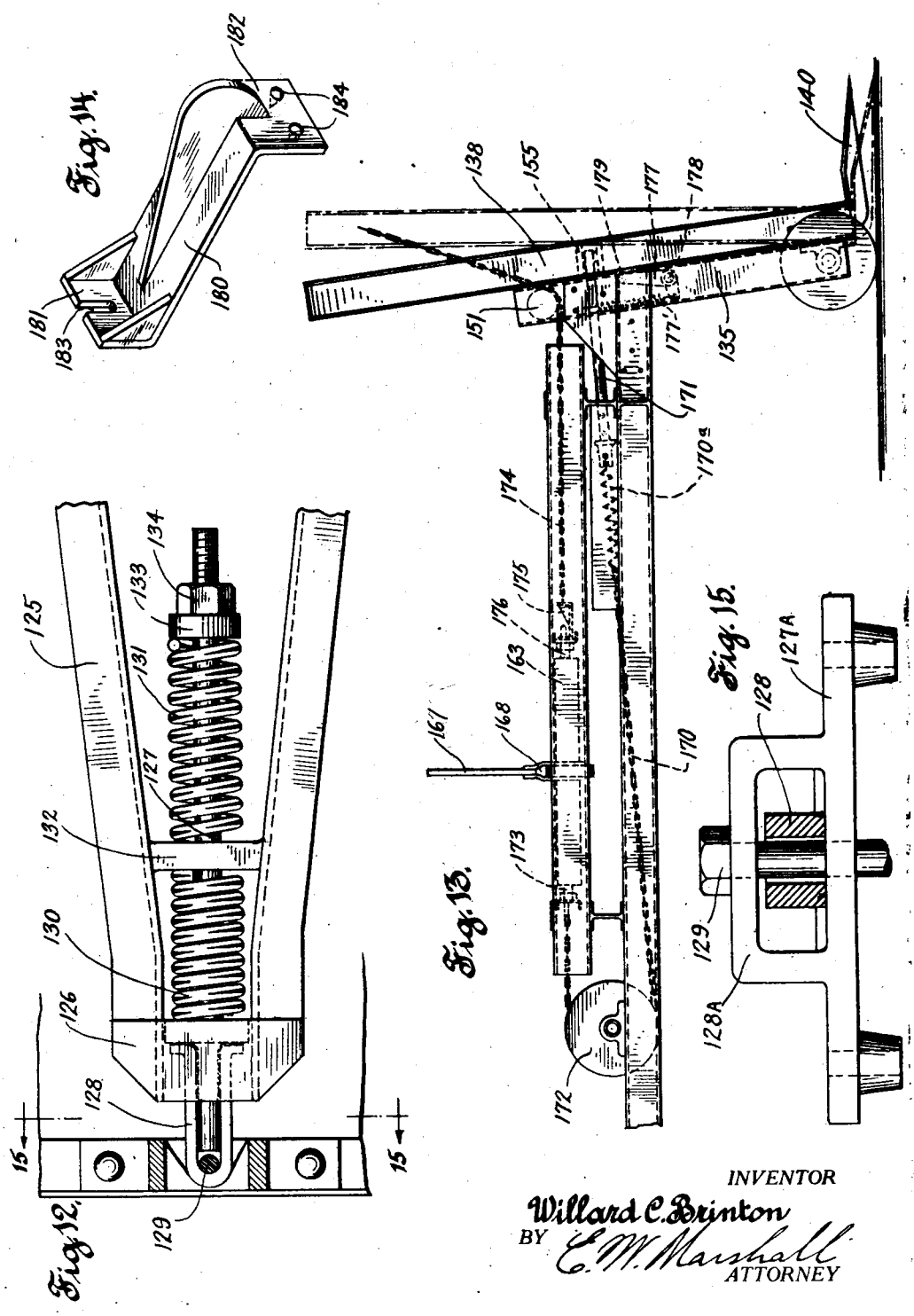

Patented July 9, 1929.

1,720,204

UNITED STATES PATENT OFFICE.

WILLARD C. BRINTON, OF NEW YORK, N. Y., ASSIGNOR TO TERMINAL ENGINEERING COMPANY, INC., OF NEW YORK, N. Y., A CORPORATION OF NEW YORK.

OBJECT-HOLDING RIG FOR TRUCKS.

Application filed May 16, 1922. Serial No. 561,324.

This invention relates to cargo or freight handling rigs or to rigs for receiving and holding objects to be transported such, for instance, as heavy bales, crates, boxes, etc.

The rig has been particularly developed for use in connection with trucks or self-propelled trucks and as an attachment for such vehicles.

One of the objects of the invention is to provide a rig adapted for attachment to a truck, for holding heavy crates, kegs, or similar objects in position to be transported by the truck without necessitating the loading of such objects on the truck platform.

Another object of the invention is to provide a rig of the character described that may be readily attached to and detached from a truck without requiring any change or modification in the construction of the truck or truck platform.

Another object of the invention is to provide a rig having its parts adjustable for use with various sizes and shapes of objects.

Another object of the invention is to provide a rig attachment for trucks so constructed and arranged that the operative parts thereof may be manipulated from the truck driver's position.

Another object of the invention is to provide an attachment of the class described for motor propelled vehicles or trucks so constructed and arranged that the motive power of the vehicle can be utilized to furnish power for lifting or picking up the rig and the object held thereon.

Another object of the invention is to provide an object receiving and holding attachment so constructed and arranged that the receiving portion thereof can be placed under a heavy crate, bale or similar object without lifting the object from the surface on which it rests.

Further objects of the invention will appear from the following specification taken in connection with the drawings which form a part of this application and in which Fig. 1 is an elevational view showing one form of rig constructed in accordance with my invention.

Fig. 2 is a top plan view of the construction shown in Fig. 1.

Fig. 3 is an enlarged detail elevation, partly in section showing the pivoted end of the rig, this view being taken substantially on line 3—3 of Fig. 1.

Fig. 4 is an enlarged detail elevation showing a portion of the latch for holding the object retaining or securing fork in retracted position.

Fig. 7 is a detail elevational view on an enlarged scale showing the pivotal portion of the fork shown in Figs. 5 and 6 and the pawl lock.

Fig. 8 is an elevational view, partly in section, taken at right angles to Fig. 7.

Fig. 9 is an elevational view on an enlarged scale showing one end of the adjusting bar by means of which the point of application of the counterbalancing spring to the fork construction shown in Figs. 5–8 inclusive is regulated.

Fig. 10 is a top plan view illustrating another form of object holding rig mounted on a truck.

Fig. 11 is an elevational view of the construction shown in Fig. 10.

Fig. 12 is a top plan view illustrating the mounting for the inner or pivoted end of the frame of the rig shown in Figs. 10 and 11.

Fig. 13 is an elevation, partly broken away, showing a modified form of the chain take up means illustrated in Figs. 10 and 11, and Fig. 14 is a perspective view showing an angle bracket by means of which a chain is attached to a bale or a crate.

Fig. 15 is a detail elevation of the bracket in which the pivoted end of the rig frame is mounted.

Figure 5:
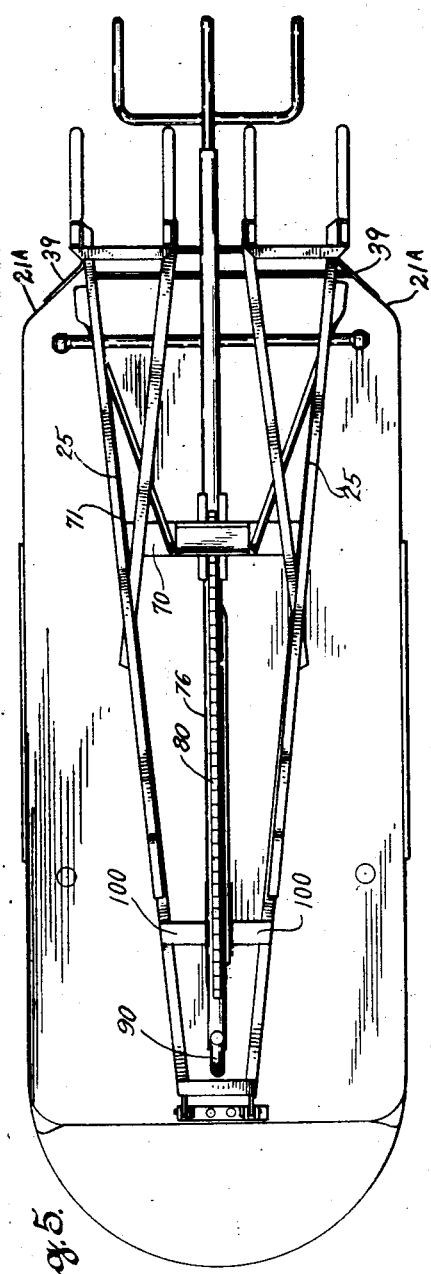
Fig. 5 is a top plan view showing another form of object securing or retaining fork and the rig with which it cooperates.

The invention may be briefly described as consisting of a rig adapted to be mounted or supported on a truck platform and having a portion adapted to be positioned close to the surface on which the truck is located to receive a heavy object such as a crate, cask or bale. Means is also provided for engaging and securing the bale in position on the rig. In the embodiments of the invention illustrated the rig is mounted on a truck having vertically movable jacks thereon and portions of the rig extend to a position above certain of the jacks whereby the rig may be swung upwardly when desired. In certain forms of the invention also the object receiving and holding portion of the rig is pivoted or adjustable with respect to the remaining portion and means is provided for swinging the receiving portion to a position clear of the ground or floor after the object has been positioned thereon. Various adjustments for the different cooperating parts are provided for in order to adapt the device for use in connection with different sizes and shapes of objects and to render the rig capable of a wide range of use. This adjustment and the other details of construction will be pointed out in the following description.

Referring first to the embodiment of the invention shown in Figs. 1–4 inclusive, I have illustrated a truck 20 having a platform 21, supporting wheels 22 and a driver's platform 23. Any suitable motive power for the truck may be provided such, for instance, as electric motors and vertically adjustable jacks 24 are mounted on the truck frame and are adapted to extend upwardly through the truck platform.

The motive power for operating the wheels and jacks may be, and preferably is, applied in the manner illustrated and described in my Patent No. 1,524,473 granted January 27, 1925 and in my copending application Serial No. 227,834 filed April 10, 1918. It should be understood, however, that any other form of vehicle or truck may be used in connection with the object holding rig.

The rig attachment comprises a main frame having side frame members 25 connected by cross frame members 26 and preferably converging toward their inner or pivoted ends. The converging ends have secured thereto lugs 27 which are pivoted as shown at 28 in brackets 29 secured as shown at 30 to the truck platform at one end thereof. A cross bar or rod 31 is secured to the frame members 25 adjacent the free ends thereof and extends laterally therefrom to a position over a pair of jacks 24, rollers 32 being mounted on the bar 31 in a position to be engaged by the jacks.

Each of the bars 25 has secured to its free end an upright frame member 33. Brace bars 33' are secured to the upper ends of the members 33 and bars 25. A substantially parallel upright member 34 is secured by cross bars 35 to each of the members 33 and the members 34 are braced by means of bars 36 connected as shown at 37 to the frame members 25.

In order to facilitate the connecting of the rig to the truck platform, each of the upright members has secured thereto a wing 39 so inclined as to engage the beveled ends or corners 21A of the truck frame. The wings, therefore, center the rig and assist in properly positioning the rig on the truck (see Figs. 1, 2, 5 and 6).

At their lower ends the uprights 33 and 34 have secured thereto forwardly extending tines 38 which as shown in Fig. 1 are adapted to be positioned close to the ground or surface on which the truck is supported. The ground or floor on which the truck is supported is hereinafter generically referred to in the specification and claims as the "truck supporting surface". The uprights 34 are spaced apart to permit free movement of the object holding or securing means as hereinafter described.

The object receiving and holding means above described may be used if desired without any further means for securing the object thereon. In so using the rig the truck is propelled forwardly and the tines 38 will be forced under the object to be transported. The weight of the object and friction between the object and the floor will be sufficient to hold the object as the tines are being positioned thereunder. The driver will then by suitably manipulating the control mechanism cause the jacks 24 to lift the frame and object carried thereby clear of the floor.

In order, however, to more securely retain an object on the holding means, I have provided suitable mechanism for extending over and preventing accidental removal of the object from the supporting means. This securing means comprises a fork 40 having a shank 41 telescoping in a pipe 42 and adapted to be secured in any desired position of adjustment by means of a pin 43, carried by the pipe and adapted to be positioned in any one of a plurality of apertures formed in the shank. The pipe 42 is pivoted at 45 in uprights 46 secured to the frame members 25 and braced by truss members 46'. The pipe 42 is further braced by means of converging bars 47 secured at their converging ends as shown at 48 to the pipe and mounted at their rear ends as shown at 49 on the pivot pin 45 carried by the standards or uprights 46. A pair of bracing bars 50 is also pivoted on the pin 45 and is secured at the opposite ends as shown at 51 to a member 52, the opposite end of the latter member being secured as shown at 53 to the pipe 42. The members and frame members just described as illustrated in Fig. 1, form a triangular truss frame for the pipe and in effect the members 50 and pipe 42 form a bell crank lever pivoted at 45 to the uprights or standards 46.

Means is provided for counterbalancing the weight of the pipe 42 and fork 40. This means consists of a pair of springs 54 at a point adjacent the connected ends thereof and connected at the opposite end to a cross bar 55 secured to the members 25. A turn buckle 56 is provided between the springs 54 for adjusting the counterbalancing means whereby any desired degree of counterbalancing may be effected. For instance, when the shank 44 of the fork 40 is pulled out of the sleeve or pipe 42 to lengthen the shank, the turn buckle 56 may be turned to provide a greater counterbalancing effect. It will be understood, however, that at no time is it desired to entirely counterbalance the weight of the fork since the weight of this member is relied on to retain it in the dotted line position shown in Fig. 1 wherein the fork is shown securing an object on the receiving and holding portion of the rig.

A latch is provided for securing the fork in retracted position and in the form of the invention shown this latch comprises a bell crank lever 57 pivoted as shown at 58 to the connected ends of the members 50 and having a hand grip 59 by means of which it may be released. At its lower end this lever has formed therein notches 60 adapted to coact with a tooth 61 formed in a bracket 62 carried by the connected ends of the frame members 25. A spring 58' normally retains the lever in latching position.

In order to support the lifting rig above described when the rig is not mounted in operative position on a truck, I have shown a U-shaped leg 63 pivoted as shown at 64 to the frame members 25 and adapted to swing downwardly under the actuation of a spring 65 secured at 66 to the members 25 and at 67 to one of the side members of the supporting leg 63. A stop 68 is provided for each side member of the leg 63 and it will be noted that the stops are located slightly beyond the pivot 64 so that the leg when open will be retained against the stops by the weight of the rig. When the rig is to be detached the pivot pins 28 are removed and the truck is propelled or moved away from the floor engaging portions of the rig. The truck and rig are so manipulated that the pivotal end of the rig frame 25 is positioned over one of the jacks 24 which is then slightly elevated to raise the rig and permit the leg 63 to spring past the vertical and to engage the stops 68.

In using the form of the invention shown in Fig. 1 the fork 40 is adjusted to a proper position to engage or extend over the object to be held on the rig in position to be transported. The truck is then propelled to a position adjacent the object with the tines 38 located close to the surface on which the truck is supported. The tines are then forced under the object. The fork 40 will then be dropped to a position such as that shown in dotted lines in Fig. 1 in which position it will secure the object on the tines. Power will then be applied by the operator to the jacks and the rig will be swung upwardly about its pivot 28 until the object is clear of the floor. The object may be then transported in any desired location.

In Figs. 5-9 inclusive, another form of the invention is illustrated and this form differs from that shown in Figs. 1-4 mainly in the object securing and retaining means. As the frame of the lifting rig and the uprights and tines are constructed in the same manner as the corresponding elements shown in Figs. 1-4 the same reference characters have been used for these parts in both sets of figures.

The object securing and retaining means, however, differs from that already described in that a greater latitude of adjustment is provided for and also means is provided for changing at will the point of application of the counterbalancing means.

Referring then to Figs. 5-9 inclusive, I have shown the object securing means as mounted on a U-shaped frame 70 secured at 71 to the side frame members 25. An I-shaped bar 72 has formed therein a plurality of openings 73 adapted to receive a pivot pin 74, the outer ends of this pin being insertable through the legs of the frame 70 and being seated in sockets 75 formed on or secured to the frame 70. Cotter pins may be used to retain pin 74 in position. A pipe 76 having a fork 77 secured to its front end is seated in a channel formed on the upper surface of the upper cross bar of the I-shaped bar 72 by means of members 78 secured to and extending upwardly therefrom. Lugs 79 are provided on the members 78 for retaining the pipe 76 against upward displacement and also for retaining a rack 80 in its proper position as hereinafter described. The rack 80 is secured to the upper surface of the pipe 76 and is adapted to be engaged by a pawl 81 secured to a pin 82 pivoted in the members 78. An arm 83 is secured to one end of the pin 82 and has connected to its outer end a spring 84, the opposite end of which as shown at 85 is secured to the outer wall of one of the members 78. At the opposite end of the pin 82 is secured a cross bar 86 having connected to its opposite ends the ends of a pair of chains 87 and 88. The opposite ends of these chains are secured to a pendant member 89 loosely mounted on the shank 91 of a handle 90 adjustably secured by a pin 92 to the rear end of the pipe 76. The member 89 will always hang down from the shank 91 thereby retaining the chains 87 and 88 in accessible position regardless of the position of the handle 90.

From the foregoing description it will be seen that the pipe 76 may be longitudinally adjusted for length and furthermore that the pipe may be moved longitudinally through the saddle mounting formed by the top of the I-bar 72 and the members 78 secured thereto. It will be evident that these adjustments will change the distribution of the weight of the bar with reference to the pivotal point thereof and in order to effectively maintain a proper counterbalance in all positions of adjustment I have provided means for shifting the point of application of the counterbalancing means.

In this embodiment of the invention, as in the preceding, a pair of counterbalancing springs 93 is secured at one end as shown at 94 to the frame of the rig and these springs are connected by the turn buckle 95. The free end of the upper spring is, however, connected to a U-shaped bracket 96 having rollers 97 extending inwardly therefrom to a position overhanging the laterally extending portions of the lower cross bar of the I-bar 72. A bar 98 is connected at its front end to the bracket 96 and the rear portion of the bar is slidably supported in uprights 100. The end of the bar 98 has secured thereto threaded member 101, the threaded portion being positioned on a screw 102 having a crank 103 secured to the end thereof whereby the rotation of the crank will rotate the screw and move the bar 98 forwardly or rearwardly. It will be evident that the operator by suitably manipulating the crank 103 may change the point of application of the counterbalancing springs 93 in such a manner as to secure any desired counterbalancing effect. The point of application may, however, be shifted from one side to the other of the pivot pin 74 if desired.

In using the object securing or retaining means shown in Figs. 5–9 the operator by pulling on the chain 88 can release the pawl 81 from engagement with the teeth of the rack 80 and can thereafter move the pipe 76 to any desired position of adjustment. If a bale of yieldable material such as cotton is being handled the pawl 81 will be retained in contact with the rack 80 as the pipe 76 is pulled rearwardly thereby facilitating the proper adjustment of the fork 77 and the secure engagement of the fork with the bale. The pawl 81 will snap into successive teeth of the rack as the pipe is pulled thereby securing the fork against retraction. After the pawl has been released by a pull on chain 88, it must be reset by pulling chain 87. It should be noted that the spring 84 is so mounted as to retain the pawl 81 either in or out of engagement with the rack.

Figure 6:
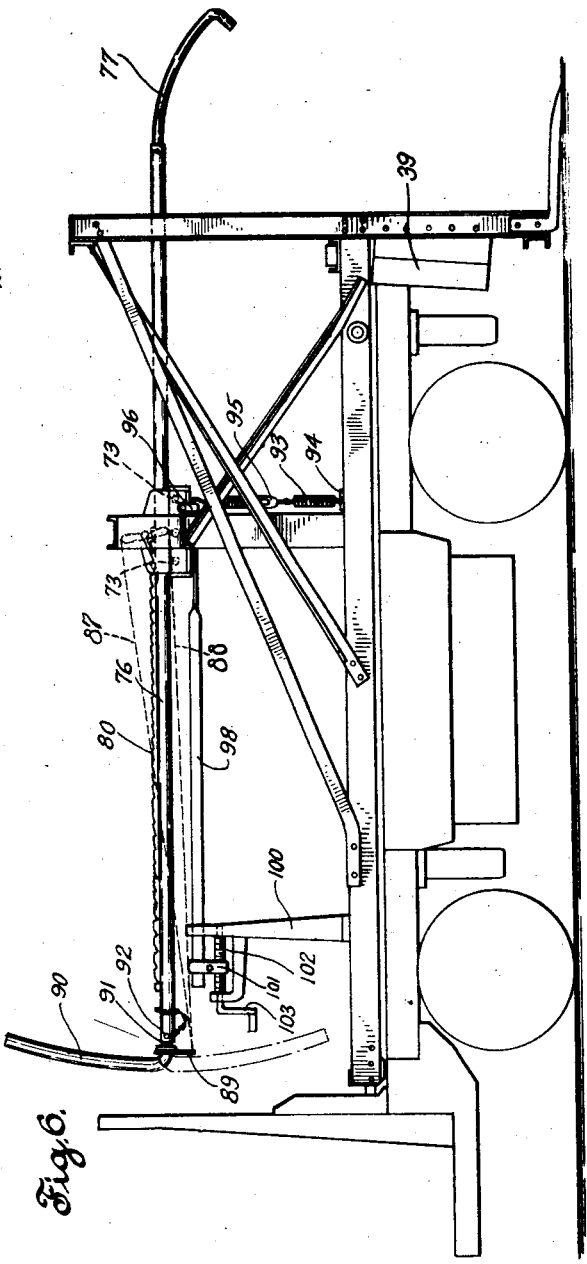
Fig. 6 is an elevation of the construction shown in Fig. 5.

For instance, if the object to be moved is low and broad the pipe 76 will be extended and handle 90 will be rotated to the position shown in dotted lines in Fig. 6. The pipe will then be pushed through the channel between members 78 until the fork 77 can be engaged over the remote upper corner. If necessary the bar 98 can be adjusted to give the proper counterbalancing action.

For high boxes or crates other and corresponding adjustments are necessary.

It will be evident therefore that provision has been made for handling all sorts, sizes and shapes of objects.

In Figs. 10 and 11 still another form of the invention is illustrated and in this form the object receiving and holding portion of the rig is pivoted with respect to what may be termed the main frame portion.

In this form of the invention the main frame portion comprises a pair of converging frame members 125 connected at their rear ends by a bracket 126. A rod 127 is slidably mounted in the bracket 126 and has secured at one end a loop 128 adapted to be positioned on an upright pin 129 secured to the platform of the truck. To prevent upward accidental displacement or undue upward movement of the pivoted end of the rig frame the bracket 127A in which the pin 129 is mounted has a U-shaped portion 128A adapted to extend over the pivoted end of the rig. The pin 129 passes through aligned openings in the bracket and truck frame or platform. The rod 127 has also mounted thereon a pair of springs 130 and 131. The spring 130 is positioned between the bracket 126 and a cross member 132 secured to the frame members 125 and the spring 131 is positioned between the other side of this cross member 132 and a washer 133 and nut 134 mounted on the free end of the rod.

The spring connection between the loop 128 and frame forms a buffer for taking up tension or compression shocks. For instance when a pull is exerted on the rig frame the draw bar or rod 127 compresses one spring (see Fig. 12) and when the frame is pushed against a box or crate the other spring takes the shock. If desired, resilient blocks or buffers 134' (see Fig. 11) may be carried by the front of the truck, to receive and take up the shock.

Each of the frame members 125 of the main frame has rigidly secured to its front end an upright member 135 and each of the upright members 135 carries at its lower end a roller or wheel 136 mounted on an axle 137. As clearly illustrated in Fig. 10 the object receiving and holding portion of the rig consists of a pair of upright members 138 pivoted as shown at 139 on the roller or wheel axle 137. Each of the upright members 138 carries at its lower end a forwardly extending tine 140.

The truck shown in Figs. 10 and 11 is provided with jacks 141 and a cross frame member 142 is secured to the members 125 and extends over the jacks whereby the jacks may be used to swing the main frame upwardly about the pivot 129 if desired. Braces 143 connect the outer ends of the cross frame member 142 with the uprights 135.

In the form of the invention illustrated in Figs. 10 and 11, however, additional means is provided for tilting the uprights 138 and tines 140 with reference to the remaining frame structure of the rig. This means comprises a flexible member such as a chain 150 adapted to extend around a roller 151 carried at the upper ends of the members 135 and to be secured in any suitable manner as shown at 152 over one of the edges of a crate, bale or box 153 to be transported. The other end of the chain or flexible member 150 is connected as shown at 154 to a bar 155 secured to the uprights 138.

In order to give the desired pull on the chain 150 any desired means may be used and in the form of the invention shown in Figs. 10 and 11 the chain is shown as extending around a sheave 156 mounted on a pintle or shaft 157, the latter being slidably mounted in a guideway 158 formed between the guide bars 159 and the upper surface 160 of the side frame members 125. A pair of bars or links 161 is secured to the shaft 157 and extends rearwardly therefrom. A bolt 162 is secured between the rear ends of the bars 161 and means similar to a turn buckle construction is provided for exerting a pull on the bolt 122. This pulling or take up means comprises a sleeve 163 having one end threaded to receive the bolt 162 and having its opposite end threaded to receive a bolt 164, the latter being secured by links or bars 165 to a pin 166 carried by cross bar 167 secured to the frame members 125. A ratchet handle 167' having a pawl 168 is mounted on the sleeve 163 formed on or secured to the outer surface of the sleeve.

The chain take up mechanism and coacting structure above described operates as follows. When an object is to be positioned on the tines 140 which are normally tilted to the dot and dash line position shown in Fig. 13 by the bell crank levers 179, hereinafter described, the truck is propelled and the tines are forced under the crate or box. One end of the chain 150 is then secured to a crate or box, the opposite end being connected to the cross bar 155. The operator then by manipulating the ratchet handle 167 will move the sheave 156 to the left thereby pulling on the chain. This pull on the chain will tilt the uprights 138 to the position shown in Fig. 11 wherein the tines and at least one end of the crate are clear of the floor. A further manipulation of the handle 167 will pull the crate or box 153 thereby more firmly securing the crate on the rig. In the case of large or long objects the far edge or corner of the object is not raised off the ground but the object as shown in dotted lines in Fig. 11, is dragged by the truck and rig with its lower forward edge or corner positioned on the rig. The tines 140 and the uprights 138 are positioned close together to facilitate swinging the crate or object in turning around a corner. The crate may then be transported if desired without the operation of the jack mechanism to elevate the entire rig about the pivot 129, the weight being partly or wholly carried by the wheels 136.

In Fig. 13 the construction and operation is similar to that of the structure shown in Figs. 10 and 11 and differs therefrom only in the take up means for the chain. In this form of the invention a pair of chains is used. One chain 170 is connected at one end to a spring 170A which in turn is connected to a bar 171. The opposite end of the bar 171 is connected to the cross bar 155 between the uprights 138. The chain 170 extends around a stationary sheave 172 and is connected to a threaded rod or bolt 173 extending into one threaded end of the turn buckle sleeve 163. Another chain 174 is secured at one end by a bracket 175 to a threaded rod or bolt 176 mounted in the opposite end of the threaded turn buckle sleeve 163. The other end of the chain 174 extends around the roller 151 and is secured in the manner already described to the crate, bale or box to be carried.

The spring 170A acts as a cushion, and takes up shocks during the transportation of heavy objects. The spring also allows for any variations in the length of the chain that may take place in transporting the bale, crate or box around corners.

I have also shown in Figs. 11 and 13 means for normally tilting the uprights to the vertical position illustrated by the dot and dash lines. This means comprises a bell crank lever 177 pivoted at 178 to one of the members 135 and having a lug or roller 179 engaging the rear surface of one of the members 138. The lever 177 is actuated by a spring 177' and thus tends to maintain the object receiving and holding portion of the rig in the dot and dash or upright position.

In Fig. 14 one form of hook for attaching the free end of the chain to a crate or box is illustrated. This hook has a flat portion 180 adapted to be positioned against a side or end of the crate and end portions 181 and 182 disposed substantially at right angles to the flat portion 180. The portion 181 has formed therein a notch 183 adapted to receive a link and the portion 182 has formed thereon or secured thereto spikes 184 adapted to pierce or penetrate one side of the crate. Any other form of means for securing the chain to the crate may be used if desired.

From the foregoing specification it will be seen that a simple, practical and efficient device has been designed for facilitating the handling of large or heavy crates, boxes, casks or similar objects and that the device may be readily attached to and detached from the truck or vehicle in connection with which it is used.

Although certain specific embodiments of the invention have been illustrated and described, it will be understood that the invention is capable of further modification and that further changes in the construction and in the arrangement of the various cooperating parts may be made without departing from the spirit or scope of the invention as expressed in the following claims.

What I claim is:—

1. In combination, a truck having a platform, an object holding rig pivotally mounted thereon and having means adapted to be positioned close to the truck supporting surface and to hold an object to be transported, and means including jacks disposed below but movable above the platform for swinging said rig on its pivot to raise the holding means clear of said surface.

2. In combination, a truck having a platform, an object holding rig mounted thereon and having means adapted to be positioned close to the truck supporting surface and to hold an object to be transported, and means including jacks disposed below but movable above the platform for raising said holding means clear of the truck supporting surface.

3. In combination, a motor propelled truck having a platform, an object holding rig mounted thereon and having means adapted to be positioned close to the truck supporting surface and to hold an object to be transported, and means including jacks disposed below but movable above the platform operable by the truck motive power for raising the holding means clear of the truck supporting surface.

4. In combination, a motor propelled truck having a platform, an object holding rig pivoted thereon above the platform and having means adapted to be positioned close to the truck supporting surface and to hold an object to be transported, means operable by the truck motive power and engaging the rig from below for lifting and swinging said rig on its pivot to raise the object holding means clear of the ground.

5. In combination, a track, an object holding rig mounted thereon and having means adapted to be positioned close to the truck supporting surface and to hold an object to be transported, means for retaining an object on said holding means, and adjustable counterbalancing means for assisting in returning said means to inoperative position.

6. In combination, a truck having a platform, an object holding rig mounted thereon and disposed above the truck platform and having means adapted to be positioned close to the truck supporting surface and to hold an object to be transported, and means carried by the truck and engageable with the rig from below for raising the rig above the truck and said holding means clear of the truck supporting surface.

7. In combination, a motor propelled truck having a platform, an object holding rig mounted above the platform and having means adapted to be positioned close to the truck supporting surface and to hold an object to be transported, and means including jacks operable by the truck motive power and engaging the rig from below for raising the holding means clear of the truck supporting surface.

8. In combination, a truck, an object holding rig mounted thereon and having means adapted to be positioned close to the truck supporting surface and to hold an object to be transported, pivoted means for retaining an object on said holding means, and counterbalancing means for said retaining means, adjustable to operate at either side of the pivot thereof.

9. In combination, a truck, an object holding rig mounted thereon and having means adapted to be positioned close to the truck supporting surface and to hold an object to be transported, pivoted means for retaining an object on said holding means, counterbalancing means for said retaining means, and means for changing the point of application of said counterbalancing means to said retaining means.

10. In combination, a truck, and an object holding rig pivoted thereon and having means adapted to be positioned close to the truck supporting surface and to hold an object to be transported, and means for centering the rig on the truck.

11. In combination, a truck, and an object holding rig pivotally mounted thereon and having means adapted to be positioned close to the truck supporting surface and to hold an object to be transported, and means on the rig engageable with the truck platform for centering the rig on the truck.

12. An object receiving and holding rig comprising a frame adapted to be pivotally supported on a truck platform and means on the rig for centering the rig on the platform.

13. An object receiving and holding rig comprising a frame adapted to be supported on a truck platform, an upright frame carried thereby and means secured to said upright frame for centering the rig on the platform.

14. In combination, a truck having a platform, jacks disposed below said platform, motor operated means for elevating the jacks, and an object holding rig having a frame pivoted on said truck and disposed above the platform, a portion of said frame being disposed over at least one of said jacks whereby operation of said jack will swing the frame on its pivot.

15. In combination, a truck having a platform, jacks disposed below said platform, motor operated means for elevating the jacks, and an object holding rig having a frame pivoted on said truck and disposed above the platform, a portion of said frame being disposed over certain of said jacks whereby operation of said jacks will swing the frame on its pivot.

16. In combination, a truck having a platform, jacks disposed below said platform, motor operated means for elevating the jacks, an object holding rig having a frame pivoted on said truck and disposed above the platform, a portion of said frame being disposed over certain of said jacks whereby operation of said jacks will swing the frame on its pivot, and means for centering said frame over said jacks.

17. In combination, a truck having a platform, an object holding rig pivoted on the truck adjacent one end of and above the platform, and jacks mounted on the truck and disposed adjacent the other end of and below the platform, said rig having a portion disposed above and engageable by said jacks.

18. In combination, a truck having a platform, an object holding rig pivoted on the truck adjacent one end of the platform, jacks mounted on the truck and disposed adjacent the other end of and below the platform, said rig having a portion disposed above and engageable by said jacks, and means for centering said rig on the platform whereby the portion of the rig engageable by the jacks will be positioned above the jacks.

19. In combination, a truck having a platform, an object holding rig having a frame positioned over said platform and pivoted on the truck and having an object holding portion positioned below the platform level and adjacent the truck supporting surface, and motor operated jacks engageable with the rig frame and carried by the truck below the platform and movable above the platform, said jacks being disposed intermediate the pivot of the rig frame and the object holding portion of the rig.

In witness whereof, I have hereunto set my hand this 4th day of May, 1922.

WILLARD C. BRINTON.